United States Patent
Achong et al.

(10) Patent No.: US 7,639,259 B2
(45) Date of Patent: Dec. 29, 2009

(54) METHOD AND APPARATUS FOR PRESERVING FONT STRUCTURE

(75) Inventors: Jeffrey Achong, Brampton (CA); Hui Zhou, Toronto (CA)

(73) Assignee: Seiko Epson Corporation, Tokyo (JP)

(\*) Notice: Subject to any disclaimer, the term of this patent is extended or adjusted under 35 U.S.C. 154(b) by 368 days.

(21) Appl. No.: 11/532,395

(22) Filed: Sep. 15, 2006

(65) Prior Publication Data

US 2008/0068384 A1    Mar. 20, 2008

(51) Int. Cl.
*G06T 11/00* (2006.01)

(52) U.S. Cl. .................. 345/471; 345/670; 345/671; 345/472

(58) Field of Classification Search .......... 345/723, 345/721, 719, 733, 460, 467, 471, 472, 660, 345/671, 670
See application file for complete search history.

(56) References Cited

U.S. PATENT DOCUMENTS

| | | | | |
|---|---|---|---|---|
| 4,672,391 A | * | 6/1987 | Hakoyama et al. | 347/209 |
| 5,050,228 A | * | 9/1991 | Yoshida et al. | 382/256 |
| 5,105,470 A | * | 4/1992 | Will | 382/186 |
| 5,459,828 A | * | 10/1995 | Zack et al. | 345/472 |
| 5,727,140 A | | 3/1998 | Ohtomo et al. | |
| 6,157,750 A | | 12/2000 | Choi et al. | |
| 6,288,725 B1 | | 9/2001 | Fu | |
| 6,356,278 B1 | | 3/2002 | Stamm et al. | |
| 6,459,431 B1 | | 10/2002 | Browne et al. | |
| 6,577,314 B1 | * | 6/2003 | Yoshida et al. | 345/471 |
| 6,614,541 B1 | | 9/2003 | Fritz et al. | |
| 7,251,365 B2 | * | 7/2007 | Fux et al. | 382/185 |
| 7,289,123 B2 | * | 10/2007 | Duggan et al. | 345/469 |
| 2002/0093683 A1 | | 7/2002 | Focazio et al. | |
| 2004/0006749 A1 | | 1/2004 | Fux et al. | |
| 2004/0080766 A1 | | 4/2004 | Lester et al. | |

\* cited by examiner

*Primary Examiner*—Ulka Chauhan
*Assistant Examiner*—Donna J Ricks

(57) ABSTRACT

A method of preserving the structure of a font character being scaled comprises analyzing the font character to determine if the font character is complex. If the font character is complex, information concerning the strokes forming the font character is extracted. The strokes are then scaled to a desired size using the extracted stroke information thereby to form a scaled font character.

19 Claims, 10 Drawing Sheets

FIG. 2A  FIG. 2B

METHOD AND APPARATUS FOR PRESERVING FONT STRUCTURE

FIELD OF THE INVENTION

The present invention relates generally to font rasterization and in particular, to a method and apparatus for preserving the structure of a font character being scaled.

BACKGROUND OF THE INVENTION

Scalable font technologies that allow characters to be printed or displayed (i.e. rendered) at a variety of different sizes with great accuracy, are well known in the art. Although a number of scalable font technologies exist, TrueType developed by Apple Computers Inc. has become widely used and accepted due to its ability to offer font developers a high degree of control over precisely how fonts are rendered.

The TrueType font specification requires fonts to be stored in files that include the information necessary for the graphics processor and the operating system software to render the font characters so that font characters are displayed and/or printed as intended. TrueType font files are made up of a series of tables, some of which are mandatory (i.e. glyph tables) and some of which are optional. Glyph tables define the outlines of font characters and are made up of straight line segments and quadratic Bézier curves. For this reason, TrueType is known as an outline font format. In addition to the shapes of the font characters, TrueType font files also include tables storing information describing how font characters should be spaced vertically and horizontally within a block of text, how font characters should be mapped (i.e. the variety of characters included in the font and the keystrokes needed to access them), and more.

The user never actually sees the font character outlines stored in the font files. When a font character is to be rendered, the font character outline in the table associated therewith is scaled to the desired size through a simple mathematical operation. The graphics processor then generates a bitmap of the font character by turning on the pixels encompassed by the scaled outline, a process commonly referred to as scan conversion or rasterization.

By storing font character outlines, only one outline per font character is needed to produce all of the sizes of that font character that are required. This enables the same font character to be displayed on monitors of different resolutions, and/or to be printed at significantly differing sizes with great accuracy.

Although TrueType facilitates rendering of font characters at arbitrary sizes, issues do arise. In some cases, when a font character is scaled to a smaller size and rendered, font character information can be lost. For example, subtle features of a font character can be merged with other font character strokes or can disappear. In more severe cases, the font character can become indistinguishable from other font characters or as a font character itself. These problems are more common with Asian script characters due to their complexity. For example, FIG. 1 illustrates a complex Asian script character that has been resized without regard to font structure. As can be seen, distinction between adjacent horizontal and vertical strokes of the resized Asian script character is lost, reducing the recognizability of the script character.

When a font character is printed via a dot-matrix printer, a translation is performed between the rasterized font character and the dot pitch of the printer. Generally, a rectangle of two pixels by two pixels is represented by a single dot printed by a dot-matrix printer having a low horizontal dot-pitch resolution. In such a dot-matrix printer, the resolution in the vertical direction is typically twice the resolution in the horizontal direction. When printing the font character at the maximum speed, it is not possible for the printhead of the dot-matrix printer to strike the paper twice to print two sequential horizontal pixels due to the limited speed of the printhead. As a result, only the first pixel will result in the printhead striking the paper to print the dot. The second pixel will be ignored. For example, if a 16-pixel line is to be printed, only 8 dots will actually be printed. In the vertical direction, the print speed is much slower and thus, full resolution is possible (i.e. a dot can be printed for each pixel). As a result of this reduced resolution, in the case of complex font characters portions the complex characters, such as relatively thin diagonal strokes can appear, broken.

As mentioned above, dot sizes on a dot-matrix printer cover approximately a two pixel by two pixel area. As a result, if breaks are to appear in horizontal and vertical character strokes being printed, a spacing of at least three pixel positions between the strokes should be provided. In addition, in the case of a dot-matrix printer having a printhead comprising eight pins, with this printhead pin density, it is not possible to print horizontal dots separated by a half-dot gap. Vertical half-dot spacing is however supported under this density. As will be appreciated, the above dot-matrix printer characteristics reduce the amount of detail that can be represented in the given space.

FIGS. 2A and 2B illustrate a portion of a font character having a diagonal stroke with a horizontal width of two pixels, and its printed form using a dot-matrix printer having a horizontal dot-resolution equal to two (2). As can be seen from FIG. 2B, the diagonal stroke represented by printed dots 200A appears disjoint and broken when printed. Gaps 204A in the diagonal stroke are apparent. The gaps 204A occur due to the fact that the printhead of the dot-matrix printer strikes the paper only once when two adjacent horizontal pixels are detected.

When complex font characters are printed via thermal printers, there are different considerations. Unlike reduced resolution dot-matrix printers, the resolution of thermal printers is very similar to that of rasterized font characters. As is known, thermal printers have a row of heating elements that are activated and deactivated in order to heat the thermally-sensitive paper that is being fed along the paper path proximal to the heating elements. After the heating elements have printed the required dots along one row, they remain hot for a period of time as the paper continues to be fed through. In some cases, the cooling period is relatively long and as a result, "bleed" occurs at the bottom of each printed dot. This is especially true where the heating elements are heated for longer periods of time, such as is required during printing of vertical font character strokes. As a result, printed horizontal lines of dots tend to have a correspondingly larger width than printed vertical lines of the same thickness.

A number of solutions have been proposed for preserving font structure information. For example, U.S. Pat. No. 6,288, 725 to Fu discloses a method of storing and scaling fonts. Characters are created using "composite strokes", or combinations of strokes. Each stroke is defined using stroke identification information to identify the type of stroke, skeleton point data that identifies the skeleton of the stroke and identification information to identify characteristics of all of the tips in a stroke. In order to reproduce a character, each stroke of the character is regenerated separately. A separate non-linear scaling coefficient table for each stroke allows for preservation of the stroke shape during scaling. The skeleton point data is used in conjunction with the stroke identification information to map out the main portion of the stroke. The identification information for each stroke tip is then used to customize the stroke. Other stroke shape control coefficients can be adjusted to further customize the stroke.

U.S. Pat. No. 6,157,750 to Choi et al. discloses a method of transforming and rendering a character using the outline shapes of characters. By using an outline of a basic character, the medial axes, radii of maximal inscribed circles and corresponding contact points of the circles with the outline, are determined. This information is stored and used to scale and/or reproduce the character.

U.S. Pat. No. 6,356,278 to Stamm et al. discloses a method and system for displaying images on a flat panel display device, such as a liquid crystal display. During display of a character, the origin point of the character is positioned at a fractional position of a pixel grid, and is then overscaled (stretched). The overscaling allows for the character to occupy whole number pixel positions instead of fractional pixel positions along a striping direction of the display device. The character is then supersampled. The supersampling allows for samples to be mapped individually to pixel subcomponents (i.e. red, blue and green). As a result, characters can have their origin at pixel subcomponent positions (one of red, green or blue) rather than only at whole pixel positions, which allows for an increase in the resolution of the display device.

U.S. Patent Application Publication No. 2004/0006749 to Fux et al. discloses a method and system for creating font format data based on source font data. Font format data of text may be stored as a stroke font that is defined by a skeleton of characters, or glyphs, in a font. The skeleton comprises elements that may be common with other glyphs, or unique to a certain glyph. Description data of the glyph includes shape data, coordinate shifting and a scaling factor for given shapes so that the glyph can be constructed from its component strokes. A rendering engine then applies style, thickness and other characteristics of a typeface. To generate font format data, a source font undergoes glyph dissection, midline extraction, element analysis and conversion. Glyph dissection begins with contour analysis, whereby points are located along the outline of the source glyph. The located points are analyzed and connected in order to form contours. Strokes are then generated to represent the glyph and the strokes are merged. Midline extraction is performed by comparing points on one stroke to their nearest point on another stroke. By repeating this process over multiple points, the midline is extracted. The combination of midlines of the glyph makes up the skeleton.

Although the above references disclose various methods of preserving font structure, improvements in the preservation of font structure are desired. It is therefore an object of the present invention to provide a novel method and apparatus for preserving the structure of a font character being scaled.

SUMMARY OF THE INVENTION

Accordingly, in one aspect there is provided a method of preserving the structure of a font character being scaled, comprising:

analyzing the font character to determine if said font character is complex; and if said font character is complex:

extracting information concerning the strokes forming said font character; and scaling said strokes to a desired size using said extracted stroke information thereby to form a scaled font character.

In one embodiment, the extracting comprises skeletonizing the font character to identify the strokes forming the font character, vectorizing each of the strokes to identify the end points thereof, mapping the end points of each stroke to a map having a dimension corresponding to the desired size of the scaled font character and connecting each pair of mapped end points with a line thereby to form scaled strokes. Vectorizing of the strokes is performed in stages. During each stage, strokes having a selected orientation are vectorized. During skeletonization, the strokes forming the font characters are eroded until the strokes have a one pixel width.

During the analyzing, in one embodiment, the foreground to background pixel ratio of the font character is compared with a threshold. Prior to the analyzing, the font character is rasterized.

After the scaled font character has been formed, the scaled font character may be printed. In this case, prior to printing, the type of printer being used to print the scaled font character is determined. Selected strokes of the scaled font character are altered when a certain type of printer is being used. When a low resolution dot-matrix printer is being used, the altering comprises increasing the thickness of diagonal strokes. When a thermal printer is being used, the altering comprises increasing the thickness of vertical strokes.

According to another aspect there is provided a method of preserving the structure of a font character being printed, comprising:

determining the type of printer to be used to print said font character; and adjusting the width of at least one stroke of said font character when a certain type of printer is being used.

According to yet another aspect there is provided an apparatus for preserving the structure of a font character being scaled, comprising:

a font character analyzer analyzing the font character to determine if said font character is complex; and a font character scaler extracting information concerning the strokes forming said font character and scaling said strokes to a desired size using said extracted stroke information thereby to form a scaled font character.

According to yet another aspect there is provided a computer-readable medium including a computer program for preserving the structure of a font character being scaled, said computer program comprising:

computer program code for analyzing the font character to determine if said character is complex;

computer program code for extracting information concerning the strokes of the font character if complex; and computer program code for scaling said strokes to a desired size using said extracted stroke information thereby to form a scaled font character.

According to still yet another aspect there is provided a computer-readable medium embodying a computer program for preserving the structure of a font character being printed, said computer program comprising:

computer program code for determining the type of printer to be used to print said font character; and computer program code for adjusting the width of at least one stroke of said font character when a certain type of printer is being used.

By skeletonizing complex font characters to be scaled to extract stroke information and using the extracted information to scale the strokes forming the font characters, font characters can be rapidly scaled with little or no loss of significant font structure. Also, by selectively adjusting the width of certain font character strokes depending on the printer being used to print font characters, the structure of font characters is maintained when printed.

BRIEF DESCRIPTION OF THE DRAWINGS

Embodiments will now be described more fully with reference to the accompanying drawings in which.

DETAILED DESCRIPTION OF THE EMBODIMENTS

In the following description, an embodiment of a method, apparatus and computer readable medium embodying a computer program for preserving the structure of a font character being scaled is provided. During the method, font characters that are complex are identified and processed for scaling. Stroke structure information is extracted from the complex font characters and is used to scale the font characters. If the font characters are to be printed on a dot-matrix printer that has a horizontal resolution of two or more pixels per dot, the font characters are analyzed to identify selected horizontal strokes and these strokes are adjusted so that the structure of the font characters is maintained when printed. If, instead, the font characters are to be printed on a thermal printer that is prone to vertical bleeding, the thickness of vertical strokes is selectively adjusted to maintain the structure of the font characters when printed.

Figure 3:
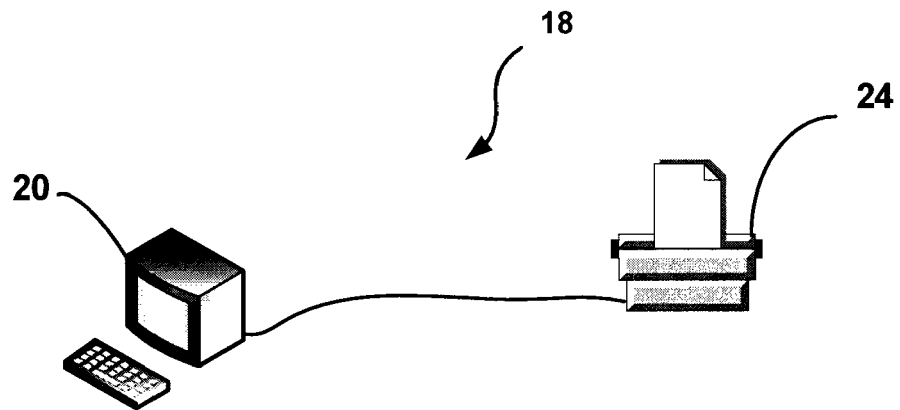
FIG. 3 is a point-of-sale system comprising a terminal and a receipt printer.

Turning now to FIG. 3, a point-of-sale system is shown and is generally identified by reference numeral 18. Point-of-sale system 18 comprises a terminal 20 in communication with a receipt printer 24. The terminal 20 is a computing device that is configured to register products being purchased and tally a total price for the registered products. The receipt printer 24 may be a dot-matrix printer, a thermal printer or other printer that receives instructions to print text and/or images from the terminal 20.

Figure 4:
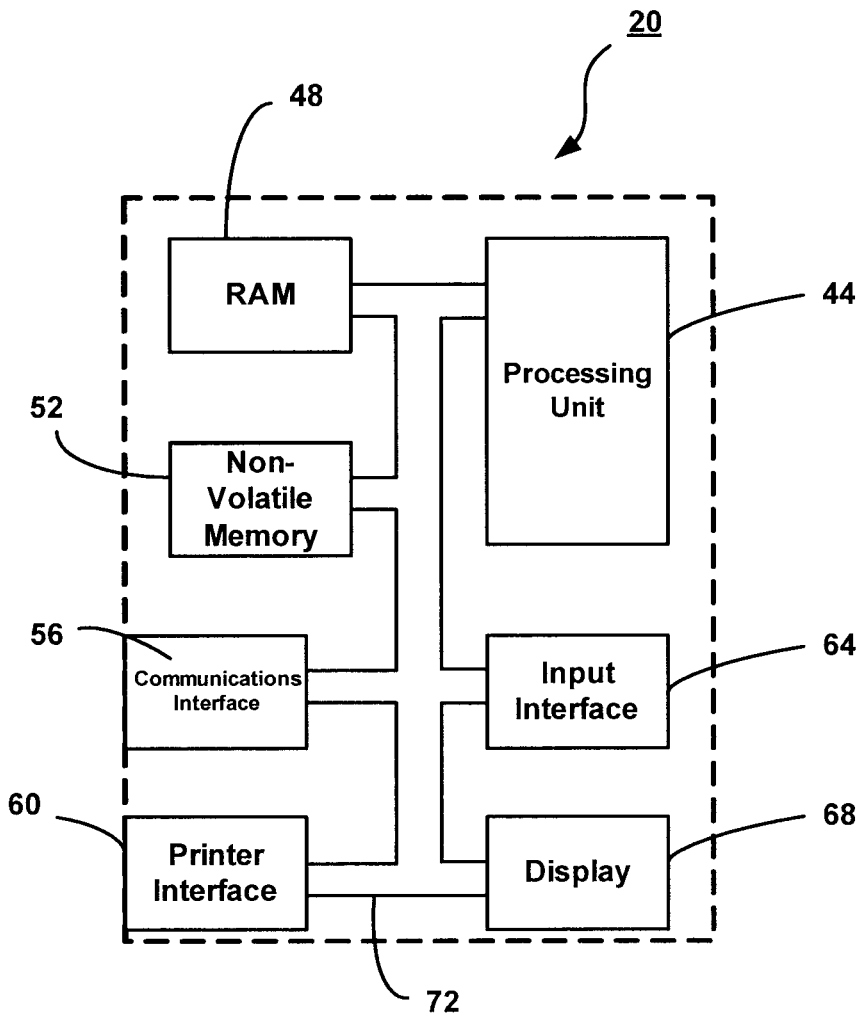
FIG. 4 is a schematic representation of the terminal of FIG. 3.

FIG. 4 illustrates the functional components of the terminal 20 and as can be seen, the terminal 20 comprises a processing unit 44, random access memory ("RAM") 48, non-volatile memory 52, a communications interface 56, a printer interface 60, an input interface 64 and a display 68, all in communication over a local bus 72. In response to a transaction, the processing unit 44 registers products being purchased, totals the prices and retrieves TrueType font information from non-volatile memory 52 for directing the receipt printer 24 to print an itemized list of products purchased and the total cost. The processing unit 44 registers any ongoing calculations for the transaction in RAM 48. The terminal 20 can be coupled to a network or server via the communications interface 56 for storing transactions centrally. Communication with the receipt printer 24 is carried out through the printer interface 60. The input interface 64 can include a keypad, mouse and/or other user input device and/or a scanner for registering products to be purchased and for enabling the configuration of the terminal 20. The display 68 presents information entered in via the input interface 64, configuration menu choices, etc.

Figure 5A:
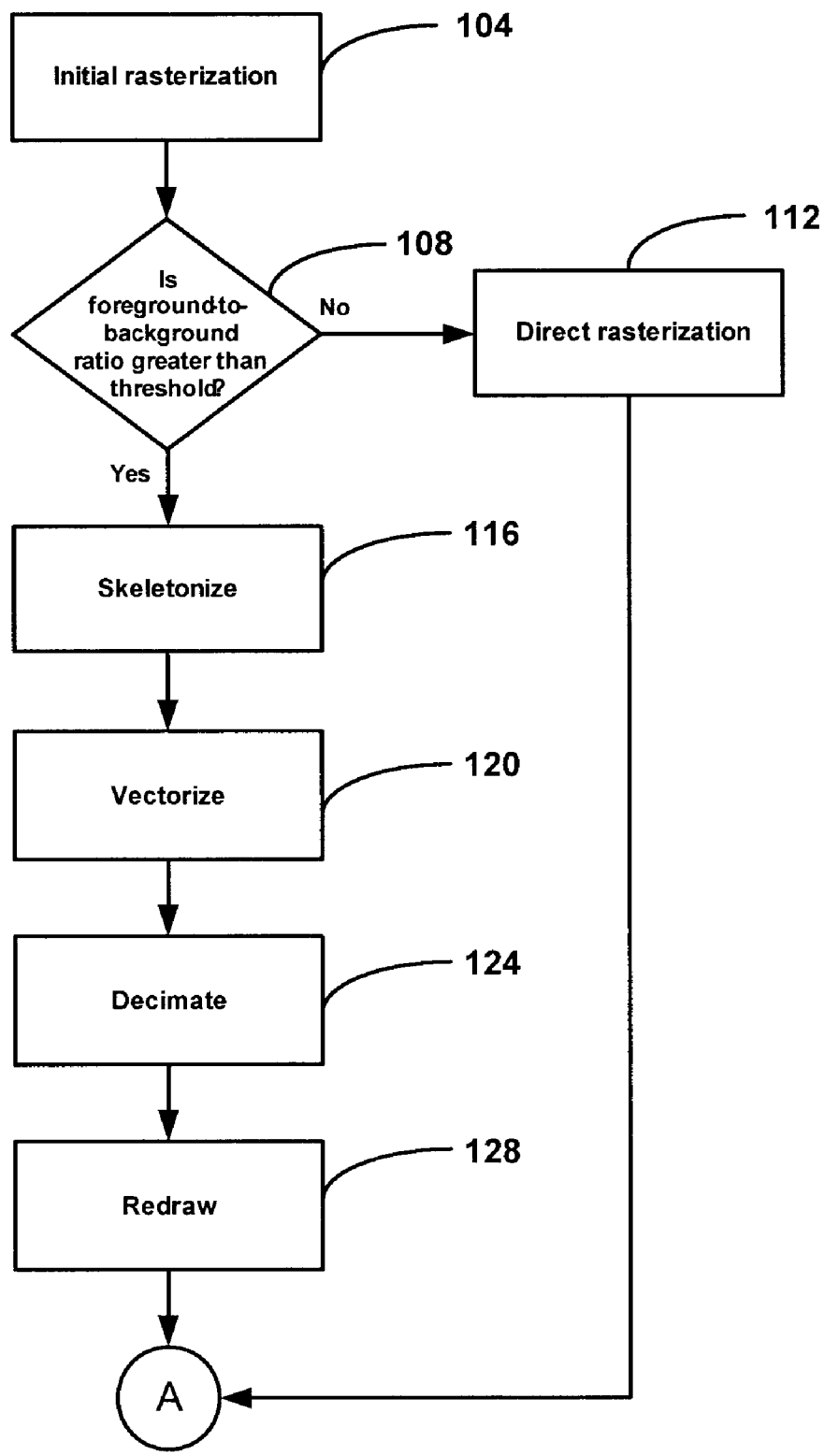
FIGS. 5A and 5B are flowcharts showing the general method for preserving font structure information employed by the terminal of FIG. 3.
Figure 5B:
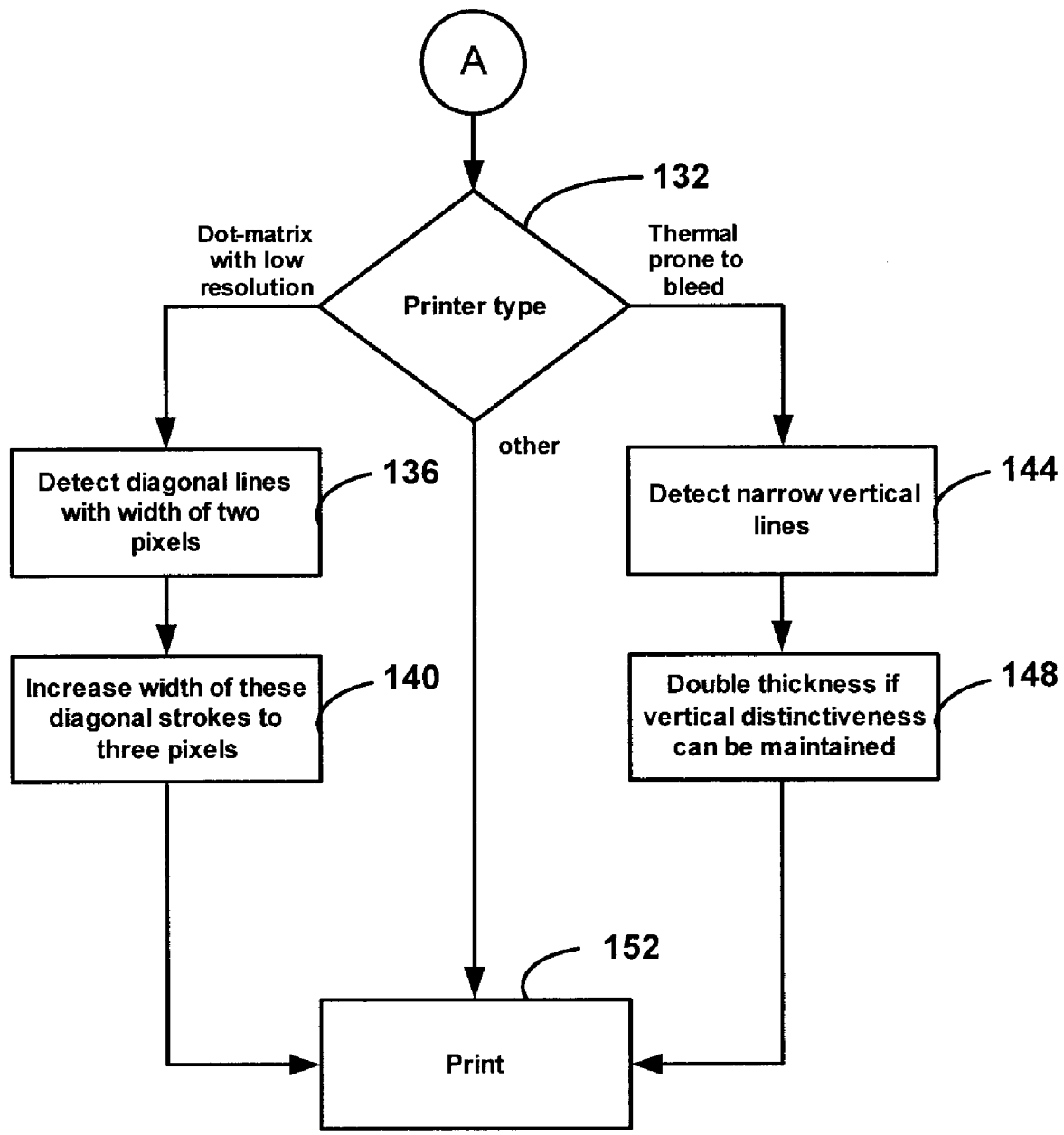

The terminal 20 in this embodiment is configured to preserve the structure of font structures being scaled so that when the scaled complex font characters are rendered, i.e. printed by receipt printer 24 or displayed by display 68, the scaled complex font characters retain their structure and remain recognizable. To achieve the above, the processing unit 44 invokes a rasterization application during rendering of font characters as will now be described with reference to FIGS. 5A and 5B.

When a font character is to be rendered, the processing unit 44 initially rasterizes the font character resulting in the font character being represented by a 500×500 pixel array (step 104). A check is then made to determine if the rasterized font character to be rendered is complex. During this check, the foreground to background pixel ratio of the rasterized font character is examined to see if it exceeds a threshold (step 108). The foreground to background ratio provides a good measure of the probability that font structure will be lost as a result of scaling and rasterization. Font characters with a higher degree of complexity, that are likely to lose font structure when scaled down, tend to have a higher foreground to background pixel ratio. In this embodiment, the threshold is equal to 18%. Thus, at step 108 if the foreground to background pixel ratio of the rasterized font character is at least 18%, the font character is deemed to be complex.

Figure 6A:
FIGS. 6A and 6B illustrate characters having relatively low and high foreground ratios respectively.
Figure 6B:

FIGS. 6A and 6B show two rasterized font characters. In the example of FIG. 6A, the foreground to background pixel ratio of the rasterized font character is equal to 17% and thus, the font character is deemed not to be complex. In the example of FIG. 6B, the foreground to background pixel ratio of the rasterized font character is equal to 27% and thus, the font character is deemed to be complex.

At step 108, if the foreground to background pixel ratio of the rasterized font character does not exceed the threshold, signifying a non-complex font character, the font character is scaled to its selected desired size in the conventional manner and directly rasterized (step 112). In this case, it is assumed that the font character will not suffer significant loss of font structure during scaling.

Instead, at step 108 if the foreground to background pixel ratio of the rasterized font character is greater than or equal to the threshold, signifying a complex font character, the processing unit 44 skeletonizes the rasterized font character (step 116). Skeletonization involves the extraction of the main font character strokes and their orientations. This is performed by evenly eroding the edges of the rasterized font character until only font character strokes having a width of one pixel remain.

Figure 7:
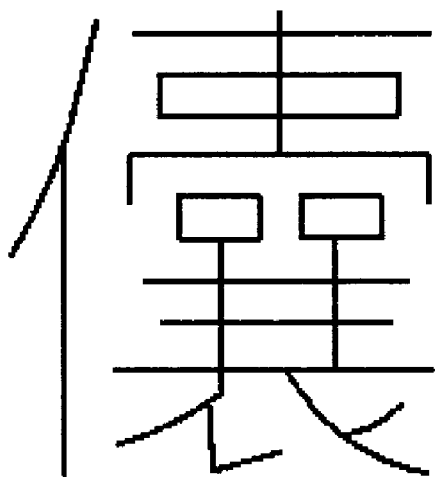
FIG. 7 illustrates the skeletonization of the character of FIG. 6B.

FIG. 7 shows the skeletonized rasterized font character of FIG. 6B. As will be noted, skeletonization has preserved the stroke information of the font character that is necessary to reconstruct the font character.

Following skeletonization of the rasterized font character, the processing unit 44 vectorizes the stroke information (step 120). Vectorization of the font character stroke information is performed in four passes. Initially, vertical strokes in the skeletonized font character are vectorized, followed by horizontal strokes, followed by strokes following a 45 degree line, followed by strokes following a 135 degree line.

Figure 8:
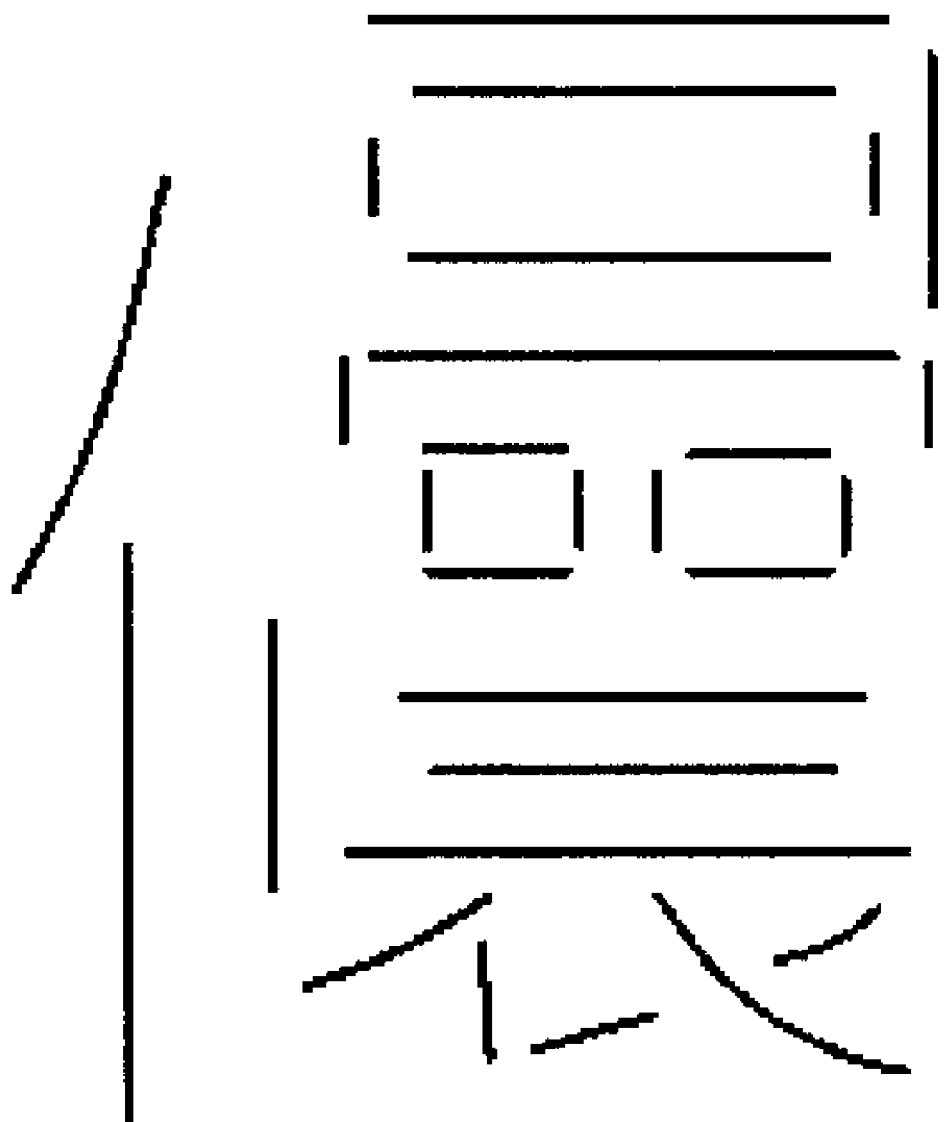
FIG. 8 illustrates the vectorization of the character of FIG. 6B.

FIG. 8 shows the vectorization of the strokes of the font character of FIG. 6B. As can be seen, each of the font character strokes is separately recorded as a vector. Each vector is defined as two points with a straight line joining them. Curved lines, if any, are broken down into multiple straight line segments.

Figure 9:
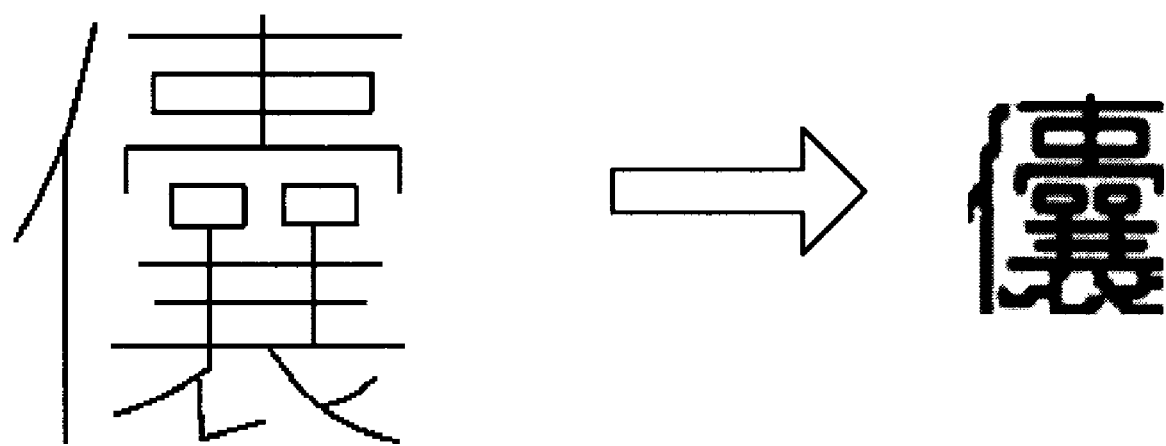
FIG. 9 shows the character of FIG. 6B before and after size reduction.

With the vectors generated at step 120, the processing unit 44 decimates the vectors to fit the vectors within the desired scaled font character dimensions (step 124). During decimation, the coordinates of the two points of each vector are mapped onto a smaller map encompassing the desired scaled font character dimensions. Once the points of each vector have been mapped to the smaller map, the processing unit 44 draws connecting lines between each pair of mapped vector points thereby to generate a scaled rasterized font character that is ready for printing (step 128). FIG. 9 illustrates the rasterized font character of FIG. 6B before and after resizing using the method described above.

Once a rasterized font character that is ready for printing is determined at either step 112 or step 128, the processing unit 44 checks the type of the receipt printer 24 by examining the printer settings of the terminal 20 to determine if adjustments to the rasterized font character need to be made to compensate for certain printer characteristics (step 132). As mentioned previously, some low resolution dot-matrix printers have a dot-pitch resolution of one dot position per two or more horizontal pixel positions. Font characters printed by these printers can appear broken, especially where there is a diagonal stroke. Also, in the case of thermal printers, the heating elements can, in some cases, be slow to cool down. As a result, printed font characters can be subject to bleed.

At step 132, if the check reveals that the receipt printer 24 is neither a dot-matrix printer nor a thermal printer, the rasterized font character is printer (step 152). If the check reveals that the receipt printer 24 is a dot-matrix printer having a low horizontal dot-pitch resolution, the processing unit 44 examines the rasterized font character to detect diagonal strokes therein having a horizontal width of two pixels (step 136).

Once diagonal strokes having a horizontal width of two pixels in the rasterized font character have been identified at step 136, the width of these diagonal strokes is increased to three pixels (step 140) and the rasterized font character is printed (step 152). By increasing the width of these diagonal strokes to three pixels, when the rasterized font character is printed, the printhead of the printer is caused to strike the paper so that two dots positioned one whole dot apart are printed. As a result, gaps in the printed diagonal strokes are reduced.

Figure 1:
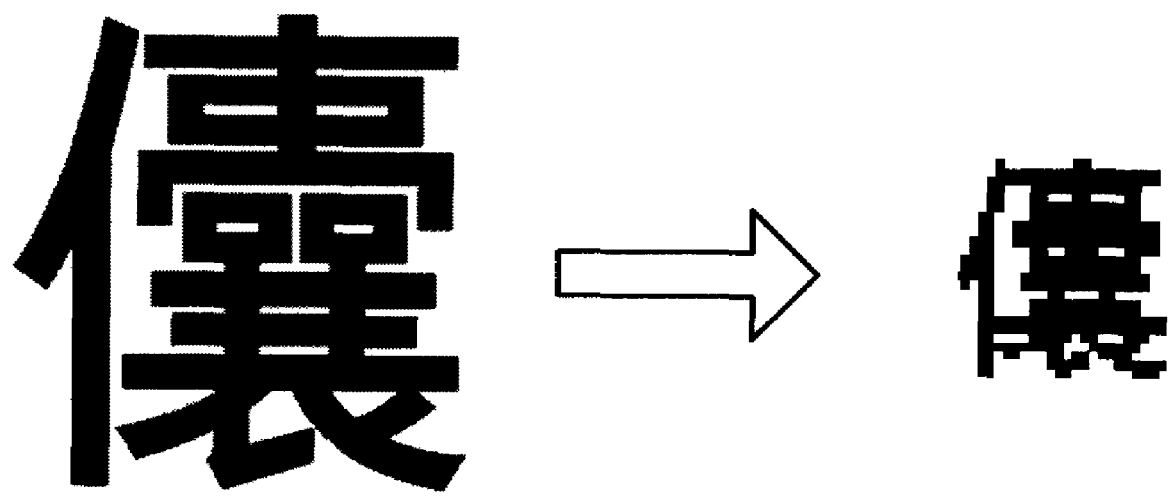
FIG. 1 shows a complex Asian font character before and after size reduction without regard to font structure.
Figure 2:
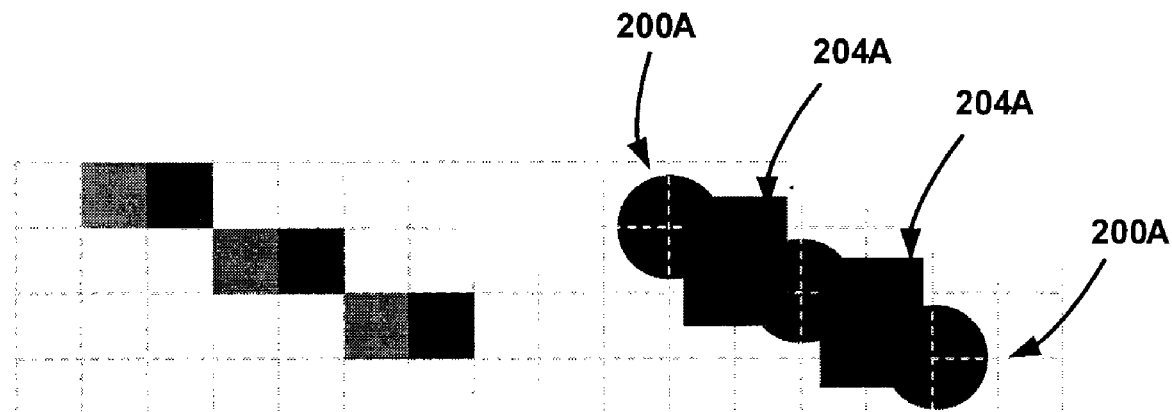
FIG. 2B illustrates the portion of the exemplary character of FIG. 2A after adjustment and its printed form using a dot-matrix printer.
Figures 10A, 10B:
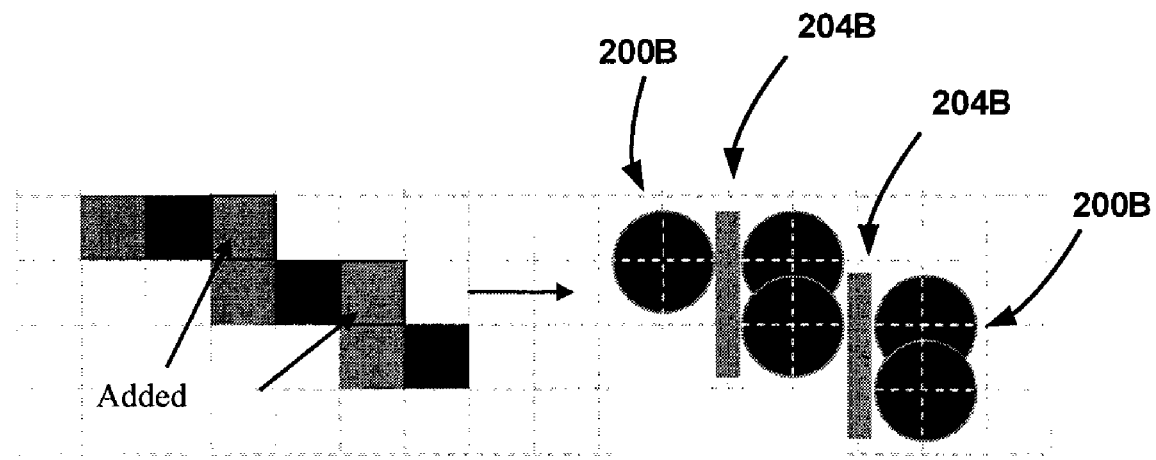
FIGS. 10A and 10B illustrate a portion of an exemplary character having a diagonal stroke of two pixels in width and its printed form using a dot-matrix printer.

FIGS. 10A and 10B illustrate the portion of the font character of FIG. 2A after the width of the diagonal stroke has been adjusted to three pixels. As can be seen, the diagonal stroke of the character of FIG. 10B as represented by the printed dots 200B has a relatively smooth appearance in comparison to when it is printed without adjustment as shown in FIG. 2B. Gaps 204B in the diagonal stroke are relatively small in comparison to the gaps 204A.

At step 132, if the check reveals that the receipt printer 24 is a thermal printer that is prone to bleeding, the processing unit 44 examines the rasterized font character to identify narrow vertical lines having a width of two pixels or less (step 144). A vertical line is defined as any foreground pixel whose left-side and right-side neighbor pixels are background pixels.

The processing unit 44 then identifies those vertical strokes having two consecutive right side and two consecutive left side neighbor background pixels. The processing unit 44 in turn doubles the thickness of these identified vertical strokes (step 148) and then prints the rasterized font character (step 152). Doubling the thickness of there vertical strokes, compensates for the artificial thickness of printed horizontal strokes resulting from bleed. Vertical strokes that do not have two consecutive right side and two consecutive left side neighbor background pixels are not doubled as it is assumed these vertical strokes are separated by a narrow gap. Increasing the thickness of such vertical strokes would result in the vertical strokes merging when printed.

Figure 11:
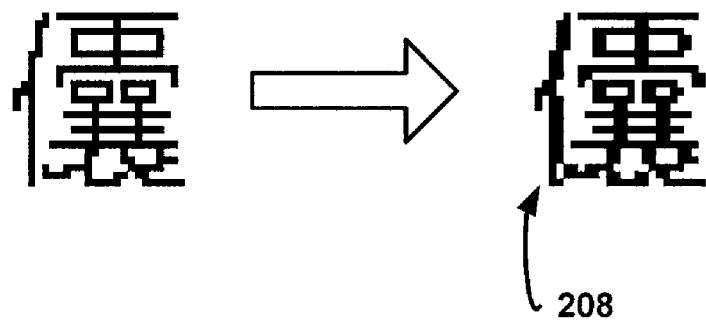
FIG. 11 shows the character of FIG. 6B both before and after adjustment of vertical line width.

FIG. 11 illustrates a complex font character having vertical strokes selectively thickened using the above approach. In location 208, the vertical stroke has not been thickened as it would merge with an adjacent horizontal line.

While the above-described embodiment illustrates the skeletonization of linear font character strokes, those skilled in the art will appreciate that curved font character strokes can also be skeletonized. Also, other methods for determining whether a font character is complex can be employed. For example, font character complexity may be based on the number and proximity of font character strokes. The threshold used to determine whether a font character is complex can vary depending on how the font characters were rasterized and to take into account added border padding. Font tables define many aspects of how font characters are to be rendered. For example, font tables may define leading or trailing spaces to evenly separate font characters. Top and bottom spacing may also be defined depending on the alignment of the font characters ("B" has less spacing above than "g"). Such spacing or padding definitions vary from font to font. In such cases, the measure of the complexity of a font character can be carried out by calculating the density of a cropped font character where the border padding is ignored and comparing the density to a threshold value.

The font rasterizing application comprises computer executable instructions and may include program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although font character preservation has been described in the context of a point-of-sale system, those of skill in the art will appreciate that the font character preservation can be carried out in virtually any computer environment where complex font characters are to be rendered at varying sizes.

Although particular embodiments have been described, those of skill in the art will appreciate that variations and modifications may be made without departing from the spirit and scope thereof as defined by the appended claims.

What is claimed is:

1. A method of preserving the structure of a font character being scaled, comprising:

rasterizing said font character;

analyzing the resultant raster of said font character to define said font character as not complex if a foreground-to-background pixel ratio of said font character is lower than a predefined threshold ratio, and define said font character as complex otherwise; and if said font character is defined as not complex, then scaling said font character by direct rasterization of said resultant raster;

if said font character is defined as complex, then:

extracting information concerning the strokes forming said font character; and scaling said strokes to a desired size using said extracted stroke information thereby to form a scaled font character.

2. The method of claim 1, wherein said extracting comprises:

skeletonizing said font character to identify the strokes forming said font character; and vectorizing each of said strokes to identify the end points thereof.

3. The method of claim 2, wherein said scaling comprises:

mapping the end points of each stroke to a map having a dimension corresponding to the desired size of the scaled font character; and connecting each pair of mapped end points with a line thereby to form scaled strokes.

4. The method of claim 3, wherein vectorizing of said strokes is performed in stages, during each stage strokes having a selected orientation being vectorized.

5. The method of claim 3, wherein during skeletonizing, the strokes forming said font character are eroded until said strokes have a one pixel width.

6. The method of claim 5, wherein said pixels are eroded from each outer of said strokes.

7. The method of claim 1, wherein said predefined threshold ratio is 18%.

8. An apparatus implementing the method of claim 1.

9. The method of claim 1, further comprising rendering said scaled font character.

10. The method of claim 9, wherein said rendering comprises printing said scaled font character.

11. The method of claim 10 further comprising:

prior to said printing, determining the type of printer being used to print said scaled font character; and altering selected strokes of said scaled font character when a certain type of printer is being used.

12. The method of claim 11, wherein when a dot-matrix printer is being used, said altering comprises increasing the thickness of diagonal strokes.

13. The method of claim 11, wherein when a thermal printer is being used, said altering comprises increasing the thickness of vertical strokes.

14. The method of claim 11, wherein said extracting comprises:

skeletonizing said font character to identify the strokes forming said font character; and vectorizing each of said strokes to identify the end points thereof.

15. The method of claim 14, wherein said scaling comprising:

mapping the end points of each stroke to a map having a dimension corresponding to the desired size of the scaled font character; and connecting each pair of mapped end points with a line thereby to form scaled strokes.

16. An apparatus for preserving the structure of a font character being scaled, comprising:

a font character analyzer analyzing the resultant raster of said font character to define said font character as not complex if a foreground-to-background pixel ratio of said font character is lower than a predefined threshold ratio, and define said font character as complex otherwise; and a font character scaler wherein:

if said font character is defined as not complex, then said font character scaler scaling said font character by direct rasterization of said resultant raster;

else if said font character is defined as complex, then said font character scaler extracting information concerning the strokes forming said font character and scaling said strokes to a desired size using said extracted stroke information thereby to form a scaled font character.

17. An apparatus according to claim 16 further comprising a font character adjuster adjusting the width of at least one stroke of said font character when a certain type of printer is being used to print said scaled font character, irrespective of whether said font character as defined as complex or not complex.

18. An apparatus according to claim 16 wherein said predefined threshold ratio is 18%.

19. An apparatus according to claim 16 wherein if said font character is defined as complex, than said font character scaler further skeletonizes said font character to identify the strokes forming said font character, vectorizes each of these strokes to identify the end points thereof, maps the end points of each stroke to a map having a dimension corresponding to the desired size of the scaled font character and connects each pair of mapping end points with a line thereby to form scaled stroke.

* * * * *